United States Patent Office 3,090,435
Patented May 21, 1963

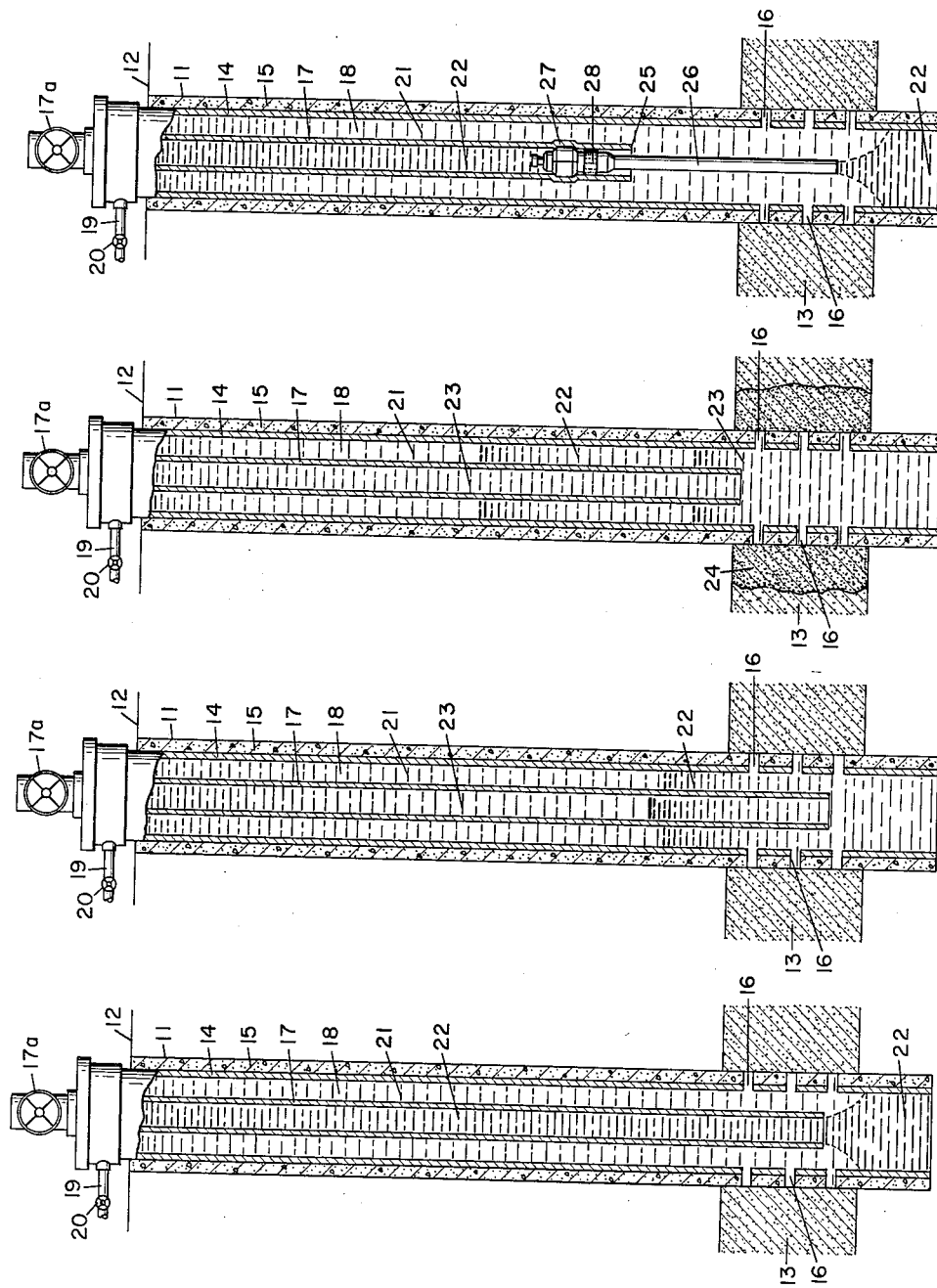

3,090,435
METHOD FOR CONSOLIDATING INCOMPETENT FORMATIONS
John K. Kerver, Warren E. Holland, and Weldon O. Winsauer, Houston, Tex., assignors, by mesne assignments, to Jersey Production Research Company, Tulsa, Okla., a corporation of Delaware
Filed Feb. 5, 1959, Ser. No. 791,318
5 Claims. (Cl. 166—29)

The present invention is directed to a method for consolidating an incompetent subsurface earth zone. More particularly the invention is concerned with the consolidation of incompetent subsurface earth zones containing water. In its more specific aspects, the invention is concerned with consolidating an incompetent subsurface earth zone without forming any plugs in a well bore piercing the zone.

The present invention may be briefly described as a method for consolidating an incompetent subsurface earth zone containing water, the zone being pierced by a well under control with a hydrostatic column of aqueous fluid. In accordance with the present invention, the aqueous fluid is displaced from the region of the incompetent zone with a clean, low fluid loss weighted fluid having a density greater than that of the aqueous fluid to form a body of the weighted fluid in the well adjacent the incompetent zone. By virtue of displacing the aqueous fluid, the body protects and blankets the region which is to be consolidated. Thereafter at least a portion of said body is displaced with a hydrolyzable liquid halide of silicon, the liquid silicon halide having a density greater than that of the aqueous fluid and that of the body. The liquid silicon halide is then forced into the incompetent zone, the body being nonreactive with the aqueous fluid and with the liquid silicon halide such that the liquid silicon halide is hydrolyzed only in the incompetent zone to consolidate the zone. The density of the weighted fluid used for displacing the aqueous fluid will be greater than that of the aqueous fluid, also the density of the silicon halide solution will ordinarily be greater than that of the aqueous fluid and that of the displacing or blanketing fluid.

It is contemplated that the present invention will be employed in a well lined with a casing and having a tubing string therein with the casing perforated to communicate with the incompetent zone. It is further contemplated and preferred that the low fluid loss weighted fluid will be flowed down the tubing string to replace the aqueous fluid such that the level of low fluid loss fluid is at a level at least above the uppermost perforation in the perforated casing. The liquid silicon halide is flowed down the tubing string to replace the body of low fluid loss weighted fluid. In the practice of the present invention, the liquid silicon halide may then be forced into the incompetent zone by applying pressure either on the casing-tubing annulus or on the tubing string or on both.

The low fluid loss weighted fluid is a clean fluid and as examples of which are the stable emulsions such as described in U.S. Patents 2,793,188 and 2,793,189 when the aqueous phase thereof is water. However, it must be mentioned that such stable emulsions must be water-in-oil emulsions such that oil is the external phase of the emulsion.

Other fluids which may be used in the practice of the present invention are low fluid loss fluids, gels, or water-in-oil emulsions such as an emulsion of an oily phase and a water phase as has been described in U.S. Patent 2,805,722. The fluids of U.S. Patent 2,805,722 are stable emulsions of an oily medium and an aqueous medium which have a controllable density, the density of the emulsion being adjusted by dissolving a weighting agent in one of the phases of the emulsion to produce a solids-free water-in-oil emulsion. Other suitable low fluid loss weighted fluids which may be used in the practice of the present invention are the water-in-oil emulsions described in pending application Serial No. 630,266 filed December 24, 1956, for Gerald G. Priest, Bryan E. Morgan, and Bertie F. Birdwell, these water-in-oil emulsions being stable emulsions employing as an emulsifying agent a water-soluble salt of purified lignin sulfonic acid or a water-soluble salt of lignin sulfonic acid containing a certain amount of ash and reducing sugars. Other suitable water-in-oil emulsions which may be used as the weighted fluid in the practice of the present invention are described in Serial No. 630,026 entitled "Well Completion Fluids" and filed December 24, 1956, for Gerald G. Priest, Bryan E. Morgan, Melba L. Lytle, Bertie F. Birdwell and Joseph A. Caldwell. In Serial No. 630,026 heat stable noncorrosive water-in-oil emulsions are described and claimed in which an emulsifying agent is employed and in which the oily phase of the emulsion comprises a substantial amount of tetrachloroethylene with one of the phases of the emulsion containing a corrosion inhibitor. These blanketing fluids may have a density in the range from about 8 to about 13.2 pounds per gallon. In short, the low fluid loss weighted fluids employed in the practice of this invention have the characteristic of low filtration rate and restricts entrance of fluids into perforations in or into earth formation when the low fluid loss weighted fluid blankets the perforations in the well. These fluids do not damage sand formations and the like with which they come into contact and the fluids, gels, or emulsions have the further property of forming a cohesive mass which does not readily substantially intermingle or mix with other fluids such as well fluids as exemplified by oil, gas, water, drilling fluids such as drilling muds and the like. The low fluid loss weighted fluids preferably have a weight at least equal to or greater than that of an aqueous fluid normally employed for blowout protection in wells or to maintain hydrostatic control of the wells. Furthermore, these fluids are free of constituents which might permanently plug an earth formation, sand, or perforation in a casing. Thus, the low fluid loss weighted fluids when used as a blanketing fluid block ingress of damaging fluids from the well to the subsurface earth zone but allow fluids from a subsurface earth zone to flow into the well bore on adjustment of the differential pressure into the well bore.

The hydrolyzable liquid silicon halide employed in the practice of the present invention is suitably a halide of silicon. A preferred compound is silicon tetrachloride. This compound has a specific gravity of about 1.5, and thus has a density sufficiently great to displace the low fluid loss weighted fluid which is employed to displace the aqueous fluid from the well. When the liquid silicon halide comes in contact with water, it hydrolyzes and forms an insoluble precipitate which consolidates an incompetent sand such that the sand does not flow with oil from the well and cause plugging of the well bore or casing.

The silicon halide or chloride is preferably employed in solution in a hydrocarbon or an oily vehicle. For example, a solution containing from about 4% to about 40% of silicon halide in diesel oil, kerosene, crude petroleum, liquid fractions thereof, halogenated hydrocarbons such as carbon tetrachloride, tetrachloroethylene (perchloroethylene), and the like may be used. These solutions may have a density from about 8 to about 13.5 pounds per gallon and suitably are used in the practice of the present invention.

There is a considerable problem in the production of oil or gas from poorly consolidated or incompetent reservoirs from which loose sand is often produced. Sand production may be so severe that the wells producing it must be shut in. In other situations the produced sand erodes the tubing and well head equipment, fills oil and gas separators, and plugs flow lines. In accordance with the present invention, incompetent zones are consolidated by injecting into the competent zone containing water a liquid silicon halide such as silicon tetrachloride. The silicon tetrachloride reacts with water in the incompetent zone and forms an insoluble precipitate and hydrochloric acid. The siliceous precipitate bonds the sand grains together. However, a problem exists in employing liquid silicon halide in a subsurface earth formation or sand in that substantially all water must be removed from flow lines and pipes through which the liquid silicon halide is introduced to prevent contaminants from being pumped or injected into the formation or through the perforations in the well casing. Any debris, contaminants, or reaction products pumped into the perforations would tend to plug them and prevent the entry of the liquid silicon halide into the formation. In usual oil wells, aqueous fluids such as drilling mud or salt water or formation water are used to maintain the well under control. Thus, aqueous fluid will react with the liquid silicon halide and form insoluble precipitates which will plug perforations either in a well casing or into the formation. In accordance with the present invention this problem has been solved by displacing aqueous fluid from a well casing with a low fluid loss weighted fluid which does not react with the aqueous fluid or with the liquid silicon halide.

The present invention will be further illustrated by reference to the drawing in which FIGS. 1 to 3 illustrate a preferred mode and in which FIG. 4 represents a modification of FIGS. 1 to 3.

Referring now to the drawing and particularly to FIGS. 1 to 3 in which identical numerals will be employed to designate identical parts, numeral 11 designates a well bore drilled from the earth's surface 12 to penetrate an unconsolidated earth formation, sand, or zone 13 from which sand production is a problem. Lining the well bore 11 is a well casing 14 which is cemented in place with primary cement 15. The casing 14 and cement 15 have been perforated to form perforations 16 communicating the interior of the casing with the unconsolidated zone 13. A tubing string 17 is arranged in the well casing 14 and is controlled at the well head by a valve 17a while the casing-tubing annulus 18 is controlled by line 19 containing valve 20.

An aqueous fluid such as a column of drilling mud 21 is in the casing-tubing annulus 18 to control the well by the hydrostatic effect thereof. The density of the aqueous fluid may be in the range from about 8.0 to about 13.0 pounds per gallon. This aqueous drilling mud is reactable with the liquid silicon halide and will form insoluble precipitates which may plug the perforations 16 or even the casing 14. In accordance with the present invention, the column of drilling mud 21 is displaced by flowing down the tubing string 17 a body of low fluid loss weighted fluid 22 which displaces the column 21 up the casing-tubing annulus 18 and outwardly therefrom through line 19 controlled by valve 20 until the body 22 has sufficiently displaced the column of mud 21 to form a blanket in the region of zone 13 as shown in FIG. 2. It is to be noted that the drilling mud 21 is now displaced away from the zone 13 which it is desired to consolidate. Thereafter, as shown in FIG. 3, the displaced fluid body 22 is then displaced upwardly in the casing-tubing annulus 18 by flowing liquid silicon halide down the tubing string 17 to form in the region of zone 13 a body 23 of the liquid silicon halide. In some situations or instances it may be desirable to space the solution of silicon halide and blanketing fluid by a body of the solvent for the silicon halide in order to insure that the interval or zone being treated is free or cleared of the blanketing fluid as sometimes may be desirable. This liquid silicon halide may suitably be introduced as desired as a solution in oil such as crude petroleum or in a solvent such as benzene, carbon tetrachloride, perchloroethylene and the like. It is preferred, however, to introduce the liquid silicon halide as a solution in crude petroleum or in a fraction thereof. Once the body 23 of the liquid silicon halide has been placed in the well casing 14 adjacent the zone 13, pressure may then be applied on the casing-tubing annulus 18 or on the tubing string 17 to force the liquid silicon halide from body 23 into zone 13 through the perforations 16 to form a consolidated area 24 by reaction of the liquid silicon halide with the water in the unconsolidated zone 13 by hydrolysis of the liquid silicon halide. Once the consolidated area 24 has been formed in unconsolidated zone 13, the body 23 of liquid silicon halide and the body 22 of the low fluid loss weighted fluid and the drilling mud 21 in the casing-tubing annulus may be removed by circulating fluid through the casing-tubing annulus 18 and the tubing string 17 in either direction as may be desired. For example, oil may be used to remove the bodies 22 and 23 as well as the column 21 of drilling mud to lighten the fluid column and to provide a pressure differential into the well bore for production of oil and/or gas from the zone 13 through the consolidated area 24 with the hydrocarbon such as oil and/or gas proceeding to the earth's surface 12 through the tubing string 17. Water may be used as the circulating fluid provided it is maintained out of contact with the body 23.

Referring to FIG. 4 in which identical numerals will be employed to designate identical parts, it will be noted that the tubing string 17 has its lower end 25 arranged above the unconsolidated zone 13, and suspended therefrom is a tubular extension member 26 which is supported in a landing nipple 27 and sealed therein by a sealing means 28. By virtue of using a tubular extension member 26 and arranging the tubing string 17 in accordance with permanent well completion techniques, which are amply described in the literature, it is possible to displace the column 21 of drilling fluid without moving the tubing string 17 as illustrated in FIGS. 2 and 3 when the column of drilling mud 21 is displaced and when the treating reagent or liquid silicon halide 23 is introduced into the well and injected into the zone 13. The steps employing the tubular extension member 26 are identical excepting that in this embodiment the tubing string 17 is not manipulated.

In some operations in employing the present invention the use of the tubular extension member may be dispensed with, especially when using a low fluid loss weighted fluid such as described herein which has the property of forming a cohesive body.

In accordance with the practice of the present invention, the liquid silicon halide is maintained out of contact with water until it is injected into the unconsolidated zone where it hydrolyzes to consolidate the zone to prevent the production of sand with the hydrocarbon such as oil and/or gas. In other words, in accordance with the practice of the present invention, the liquid silicon halide is always separated from any aqueous fluid which is used in the well bore. This is quite advantageous and useful in that formations or sands may now be consolidated without danger of forming deposits in wells or in perforations such as well casings and the like.

The nature and objects of the present invention having been completely described and illustrated, what we wish to claim as new and useful and secure by Letters Patent is:

1. A method for consolidating an incompetent subsurface earth zone containing water pierced by a well under control with a hydrostatic column of aqueous fluid which comprises displacing said aqueous fluid from the region of said incompetent zone upwardly in said well with a low fluid loss weighted solids-free, water-in-oil emulsion having a density greater than that of the aqueous fluid to form a body of said weighted emulsion in said well adjacent said incompetent zone, displacing a portion of said body upwardly in said well with a hydrolyzable liquid halide of silicon, said liquid halide of silicon having a density greater than that of said aqueous fluid and said body, and then forcing said liquid halide of silicon into said incompetent zone, said body being nonreactive with said aqueous fluid and with said liquid halide of silicon whereby said liquid halide of silicon is hydrolyzed only in said incompetent zone to consolidate said zone.

2. A method for consolidating an incompetent subsurface earth zone containing water pierced by a well lined with a perforated casing and under control with a hydrostatic column of aqueous fluid which comprises displacing said aqueous fluid from the region of said incompetent zone upwardly in said well with a low fluid loss weighted solids-free, water-in-oil emulsion having a density greater than that of the aqueous fluid to form a body of said weighted emulsion in said well adjacent said incompetent zone, displacing a portion of said body upwardly in said well with a hydrolyzable liquid halide of silicon, said liquid halide of silicon having a density greater than said aqueous fluid and said body, and then forcing said liquid halide of silicon through the perforations in said casing into said incompetent zone, said body being nonreactive with said aqueous fluid and with said liquid halide of silicon whereby said liquid halide of silicon is hydrolyzed only in said incompetent zone to consolidate said zone and said perforations remain free of any obstruction which might plug same.

3. A method for consolidating an incompetent subsurface earth zone containing water pierced by a well lined with a perforated casing and having a tubing therein and under control with a hydrostatic column of aqueous fluid which comprises flowing a low fluid loss weighted solids-free, water-in-oil emulsion having a density greater than that of the aqueous fluid down said tubing string to displace said aqueous fluid from the region of said incompetent zone upwardly in said well and to form a body of said weighted emulsion in said well adjacent said incompetent zone, flowing a hydrolyzable liquid halide of silicon down said tubing string to displace a portion of said body upwardly in said well, said liquid halide of silicon having a density greater than said aqueous fluid and said body, and then forcing said liquid halide of silicon through the perforations in said casing into said incompetent zone, said body being nonreactive with said aqueous fluid and with said liquid halide of silicon whereby said liquid halide of silicon is hydrolyzed only in said incompetent zone to consolidate said zone and said perforations remain free of any obstruction which might plug same.

4. A method for consolidating an incompetent subsurface earth zone containing water pierced by a well under control with a hydrostatic column of aqueous fluid which comprises displacing said aqueous fluid from the region of said incompetent zone upwardly in said well with a low fluid loss weighted water-in-oil emulsion having a density greater than that of the aqueous fluid to form a body of said weighted emulsion in said well adjacent said incompetent zone, said emulsion being free of solids, displacing a portion of said body upwardly in said well with a hydrolyzable liquid chloride of silicon, said liquid chloride of silicon having a density greater than said aqueous fluid and said body, and then forcing said liquid chloride of silicon into said incompetent zone, said body being nonreactive with said aqueous fluid and with said liquid chloride of silicon whereby said liquid chloride of silicon is hydrolyzed only in said incompetent zone to consolidate said zone.

5. A method in accordance with claim 4 in which the liquid chloride is silicon tetrachloride.

References Cited in the file of this patent

UNITED STATES PATENTS

| | | |
|---|---|---|
| 2,019,908 | Kennedy et al. | Nov. 5, 1935 |
| 2,259,875 | Bent et al. | Oct. 21, 1941 |
| 2,345,713 | Moore et al. | Apr. 4, 1944 |
| 2,469,354 | Bond | May 10, 1949 |
| 2,805,722 | Morgan et al. | Sept. 10, 1957 |
| 2,808,886 | Bail et al. | Oct. 8, 1957 |